United States Patent
Iikura et al.

(10) Patent No.: US 8,799,709 B2
(45) Date of Patent: Aug. 5, 2014

(54) SNAPSHOT MANAGEMENT METHOD, SNAPSHOT MANAGEMENT APPARATUS, AND COMPUTER-READABLE, NON-TRANSITORY MEDIUM

(75) Inventors: Fumi Iikura, Kawasaki (JP); Yasuhide Matsumoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 619 days.

(21) Appl. No.: 12/929,785

(22) Filed: Feb. 15, 2011

(65) Prior Publication Data
US 2011/0225582 A1 Sep. 15, 2011

(30) Foreign Application Priority Data
Mar. 9, 2010 (JP) ................................ 2010-051423

(51) Int. Cl.
*G06F 11/00* (2006.01)
*G06F 11/14* (2006.01)

(52) U.S. Cl.
CPC ...... *G06F 11/1415* (2013.01); *G06F 2201/815* (2013.01); *G06F 2201/84* (2013.01)
USPC .............................................. 714/19; 714/21

(58) Field of Classification Search
CPC ............ G06F 11/1433; G06F 11/1438; G06F 11/1448
USPC ................................................ 714/15, 19, 21
See application file for complete search history.

(56) References Cited

U.S. PATENT DOCUMENTS

| | | | | |
|---|---|---|---|---|
| 5,745,669 A | * | 4/1998 | Hugard et al. ..................... | 714/3 |
| 8,135,930 B1 | * | 3/2012 | Mattox et al. ................. | 711/162 |
| 8,255,731 B1 | * | 8/2012 | Alsina et al. .................. | 713/340 |
| 2005/0164692 A1 | * | 7/2005 | Roth et al. ..................... | 455/419 |
| 2006/0136720 A1 | * | 6/2006 | Armstrong et al. ........... | 713/164 |
| 2008/0162590 A1 | * | 7/2008 | Kundu et al. ................. | 707/202 |
| 2009/0100158 A1 | | 4/2009 | Sonkin et al. | |
| 2009/0177718 A1 | | 7/2009 | Patterson et al. | |
| 2009/0249284 A1 | * | 10/2009 | Antosz et al. ................. | 717/104 |
| 2010/0011178 A1 | * | 1/2010 | Feathergill .................... | 711/162 |
| 2010/0070678 A1 | * | 3/2010 | Zhang et al. ...................... | 711/6 |
| 2010/0107158 A1 | * | 4/2010 | Chen et al. .......................... | 718/1 |
| 2010/0114825 A1 | * | 5/2010 | Siddegowda ................. | 707/638 |
| 2010/0251363 A1 | * | 9/2010 | Todorovic ...................... | 726/22 |

(Continued)

FOREIGN PATENT DOCUMENTS

| | | |
|---|---|---|
| GB | 2 424 153 A | 9/2006 |
| JP | 9-146762 | 6/1997 |
| JP | 2005-332223 | 12/2005 |
| JP | 2009-51452 | 3/2009 |

OTHER PUBLICATIONS

United Kingdom Search Report issued May 25, 2011 in corresponding United Kingdom Patent Application GB1102371.0.

(Continued)

*Primary Examiner* — Joshua Lohn
(74) *Attorney, Agent, or Firm* — Staas & Halsey LLP

(57) ABSTRACT

A snapshot management method includes detecting a change in a configuration of a virtual machine; recording, in a storage unit, a snapshot of a file system of the virtual machine when the change in the configuration is detected; and determining a stable operation of the virtual machine by monitoring an operation status of the virtual machine and deleting, from the storage unit, the last recorded snapshot for the virtual machine when the operation status satisfies a predetermined condition.

13 Claims, 13 Drawing Sheets

(56) References Cited

U.S. PATENT DOCUMENTS

2011/0023114 A1* 1/2011 Diab et al. .................. 726/22
2011/0047195 A1* 2/2011 Le et al. .................... 707/827
2011/0167473 A1* 7/2011 Evans et al. .................. 726/1
2013/0232245 A1* 9/2013 Antosz et al. ............. 709/222

OTHER PUBLICATIONS

United Kingdom Search Report issued May 26, 2011 in corresponding United Kingdom Patent Application GB1102371.0.

* cited by examiner

FIG.5

| SSID | TIME | STATE |
|------|------|-------|
| 1 | xx:xx | VALID |
|   |       |       |
|   |       |       |

| PORT NUMBER | NUMBER OF PACKETS |
|---|---|
| 80 | 35928 |
| ... | ... |
| : | : |

116

SNAPSHOT MANAGEMENT METHOD, SNAPSHOT MANAGEMENT APPARATUS, AND COMPUTER-READABLE, NON-TRANSITORY MEDIUM

CROSS-REFERENCE TO RELATED APPLICATION

This patent application is based upon and claims the benefit of priority of the prior Japanese Patent Application No. 2010-051423 filed on Mar. 9, 2010, the entire contents of which are incorporated herein by reference.

FIELD

The embodiments discussed herein are related to snapshot management methods, snapshot management apparatuses, and computer-readable, non-transitory media, and more particularly to a snapshot management method, a snapshot management apparatus, and a computer-readable, non-transitory medium for managing snapshots of virtual machines.

BACKGROUND

An example of virtualization technology of computers is a virtual machine. According to virtual machines, it is possible to mitigate limitations caused by the physical configuration of a computer. For example, by operating plural virtual machines in a single computer, the computer may be used as plural computers.

As a computer is virtualized by virtual machines, the storage unit of the computer (for example, an HDD (Hard Disk Drive)) may also be virtualized. Specifically, in the HDD of a computer, a file system is established for each virtual machine operating in the computer.

A file system of a virtual machine is merely a part of the physical HDD, and therefore snapshots of the file system may be easily saved. By saving snapshots, rollback may be easily performed when a failure occurs. Snapshots are basically saved in accordance with instructions input by a user (see, for example, Japanese Laid-Open Patent Publication No. 2005-332223). Furthermore, there are discussions of automatically saving snapshots at predetermined timings (see, for example, Japanese Laid-Open Patent Publication No. 2009-51452 and Japanese Laid-Open Patent Publication No. 09-146762).

However, as snapshots are saved, the storage capacity is consumed. Therefore, when many snapshots are needlessly saved, the storage capacity is wastefully consumed.

SUMMARY

According to an aspect of the invention, there is a snapshot management method executed by a computer that includes detecting a change in a configuration of a virtual machine; recording, in a storage unit, a snapshot of a file system of the virtual machine when the change in the configuration is detected; and determining a stable operation of the virtual machine by monitoring an operation status of the virtual machine and deleting, from the storage unit, the last recorded snapshot for the virtual machine when the operation status satisfies a predetermined condition.

According to an aspect of the invention, a snapshot management apparatus includes a configuration change detection unit that detects a change in a configuration of a virtual machine; a snapshot recording unit that records, in a storage unit, a snapshot of a file system of the virtual machine when the change in the configuration is detected; and a stable operation determining unit that determines a stable operation of the virtual machine by monitoring an operation status of the virtual machine and deleting, from the storage unit, the last recorded snapshot for the virtual machine when the operation status satisfies a predetermined condition.

According to an aspect of the invention, a snapshot management apparatus includes a processor to detect a change in a configuration of a virtual machine, to record, in a storage unit, a snapshot of a file system of the virtual machine when the change in the configuration is detected, and to determine a stable operation of the virtual machine by monitoring an operation status of the virtual machine and deleting, from the storage unit, the last recorded snapshot for the virtual machine when the operation status satisfies a predetermined condition.

According to an aspect of the invention, a computer-readable, non-transitory medium storing a program that causes a computer to execute a method includes detecting a change in a configuration of a virtual machine; recording, in a storage unit, a snapshot of a file system of the virtual machine when the change in the configuration is detected; and determining a stable operation of the virtual machine by monitoring an operation status of the virtual machine and deleting, from the storage unit, the last recorded snapshot for the virtual machine when the operation status satisfies a predetermined condition.

The object and advantages of the invention will be realized and attained by means of the elements and combinations particularly pointed out in the appended claims. It is to be understood that both the foregoing general description and the following detailed description are exemplary and explanatory and are not restrictive of the invention as claimed.

BRIEF DESCRIPTION OF THE DRAWINGS

FIG. 5 illustrates an example of an SS managing table;

FIG. 12 illustrates an example of an access record table; and

DESCRIPTION OF EMBODIMENTS

Preferred embodiments of the present invention will be explained with reference to accompanying drawings.

Figure 1:
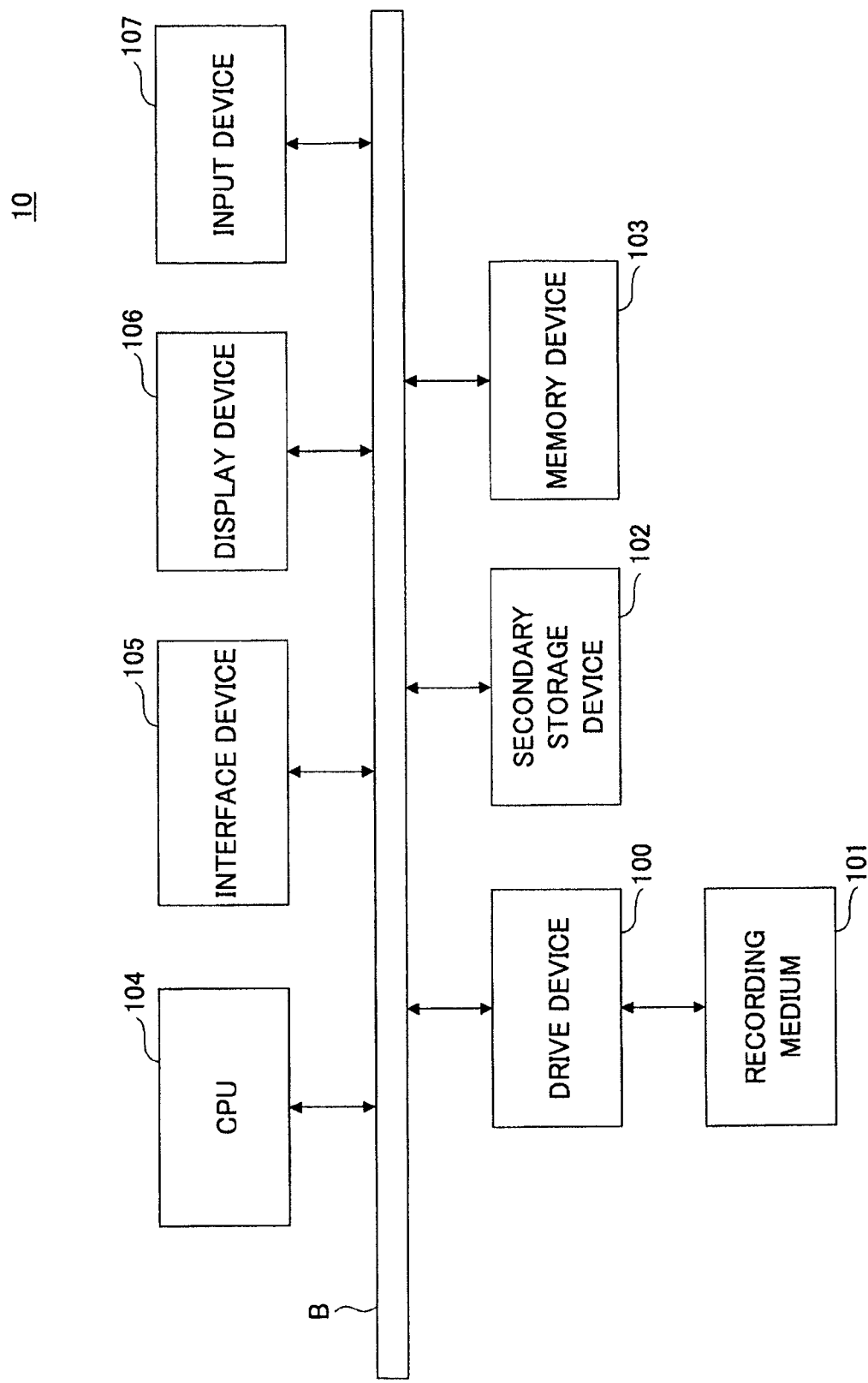
FIG. 1 illustrates a hardware configuration of an information processing apparatus according to an embodiment of the present invention.

FIG. 1 illustrates a hardware configuration of an information processing apparatus according to an embodiment of the present invention. An information processing apparatus 10 illustrated in FIG. 1 includes a drive device 100, a secondary storage device 102, a memory device 103, a CPU 104, an interface device 105, a display device 106, and an input device 107, which are interconnected by a bus B.

Programs for implementing processes in the information processing apparatus 10 are provided by a recording medium 101 such as a CD-ROM. When the recording medium 101 having a program recorded therein is set in the drive device 100, the program is installed in the secondary storage device 102 from the recording medium 101 via the drive device 100. However, the program does not necessarily need to be installed from the recording medium 101; the program may be downloaded from another computer via a network. The secondary storage device 102 stores the installed program as well as necessary files and data.

The memory device 103 reads a program from the secondary storage device 102 and stores the program, when an instruction to activate the program has been received. The CPU 104 implements functions relevant the information processing apparatus 10, according to the program stored in the memory device 103. The interface device 105 is for connecting the information processing apparatus 10 to a network. The display device 106 is for displaying a GUI (Graphical User Interface) in accordance with the program. The input device 107 includes a keyboard and a mouse, and is used for inputting various operation instructions.

The display device 106 and the input device 107 may be included in another computer that is connected to the information processing apparatus 10 via a network. Furthermore, when programs to be installed are transferred via a network, the information processing apparatus 10 does not necessarily need to include the drive device 100.

Figure 2:
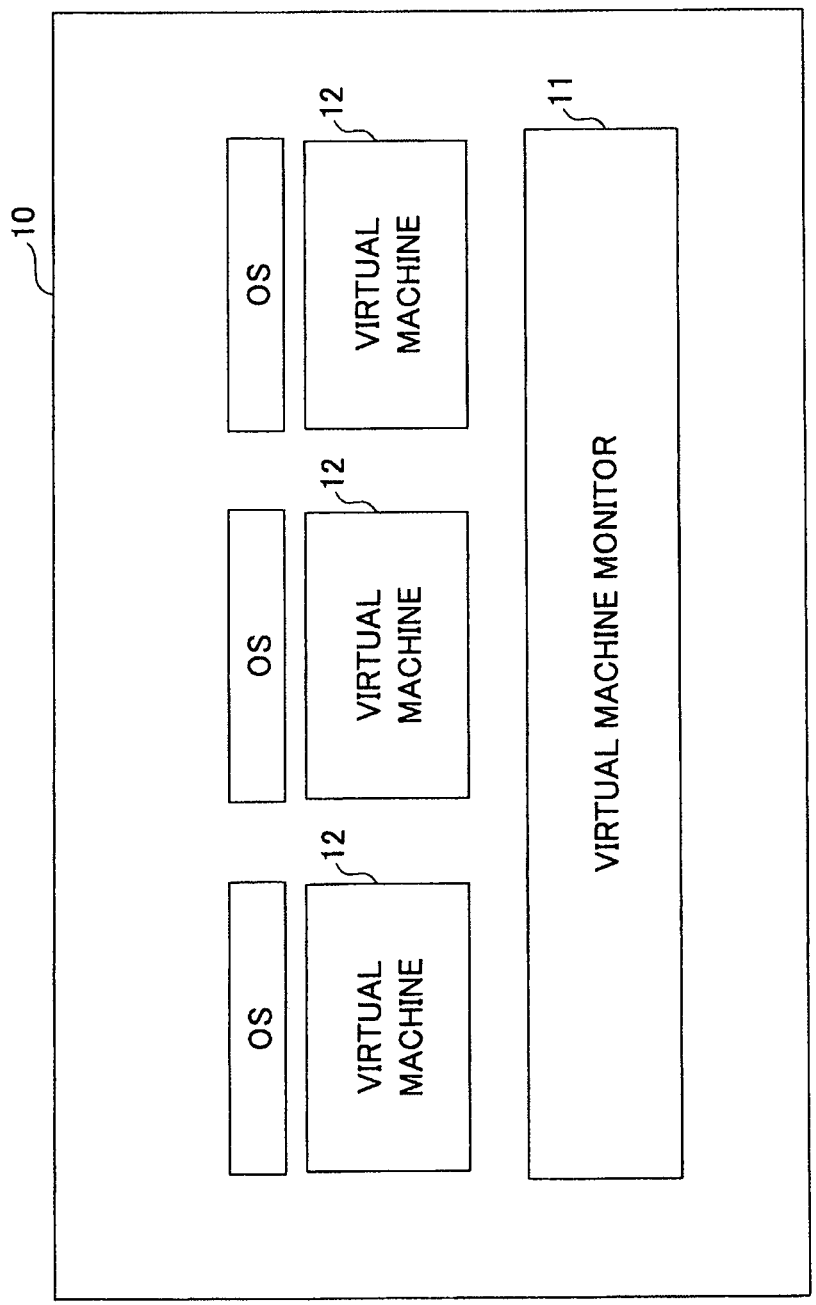
FIG. 2 illustrates a software configuration of the information processing apparatus according to an embodiment of the present invention.

FIG. 2 illustrates a software configuration of the information processing apparatus 10 according to an embodiment of the present invention. FIG. 2 illustrates a virtual machine monitor 11 and one or more virtual machines 12 operating in the information processing apparatus 10. The virtual machine monitor 11 and the virtual machines 12 are implemented by processes that the CPU 104 is caused to execute by programs installed in the information processing apparatus 10.

The virtual machine monitor 11 manages the virtual machines 12. In the present embodiment, the virtual machine monitor 11 saves snapshots of file systems (virtual storage devices) of the virtual machines 12. Snapshots are images of file systems 122 (see FIG. 3) at a certain time point, or a group of files (or one file) storing such images.

The virtual machines 12 are virtual computers. Each virtual machine 12 is operated as if it were one physical computer. For example, as illustrated in FIG. 2, different operating systems (OS) may be operated on the respective virtual machines 12. Furthermore, various software items maybe operated in each OS, as in the case of a regular computer.

Figure 3:
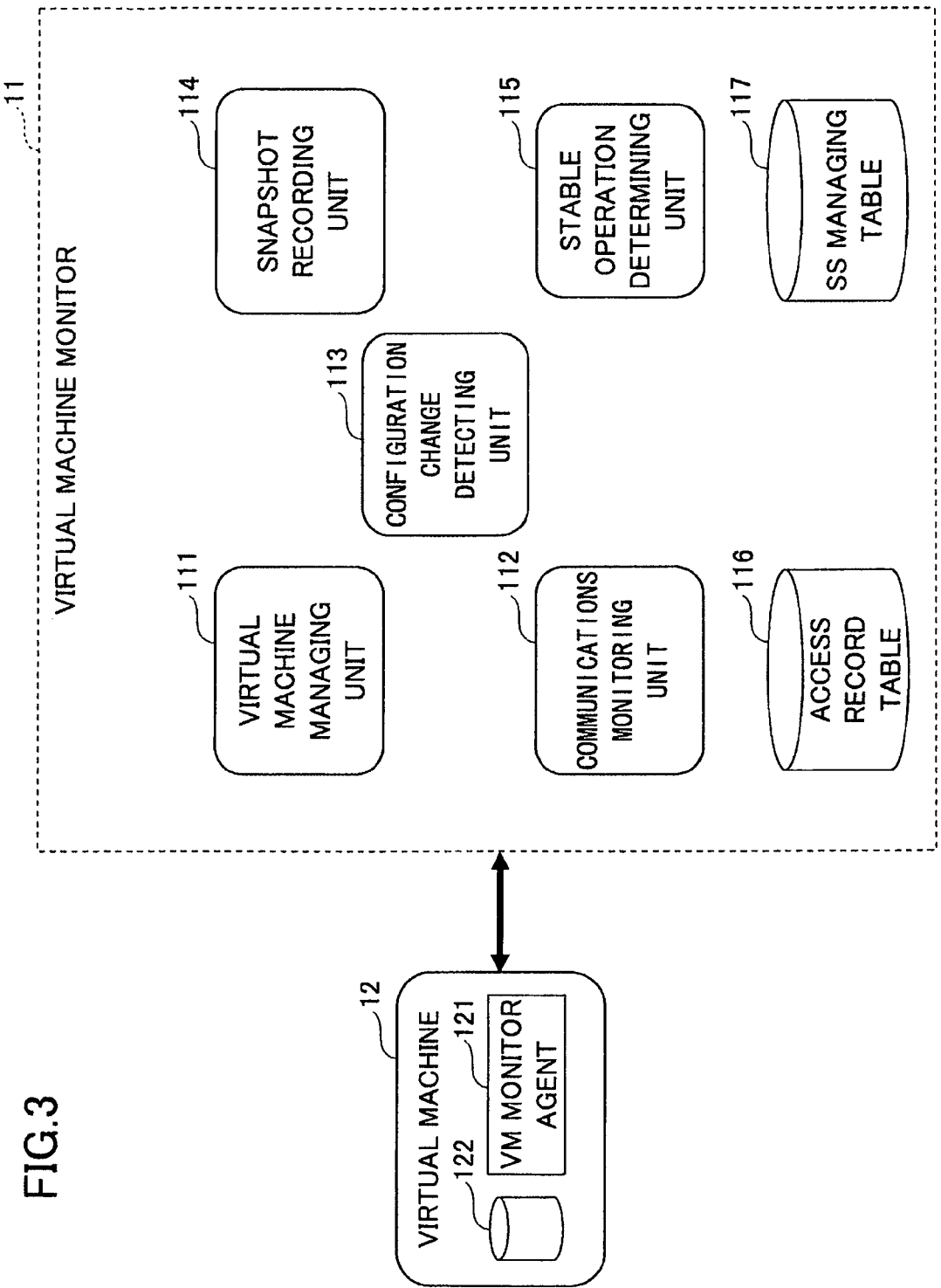
FIG. 3 illustrates a functional configuration of a virtual machine monitor and a virtual machine according to an embodiment of the present invention.

FIG. 3 illustrates a functional configuration of the virtual machine monitor 11 and the virtual machine 12 according to an embodiment of the present invention. As illustrated in FIG. 3, the virtual machine monitor 11 includes a virtual machine managing unit 111, a communications monitoring unit 112, a configuration change detecting unit 113, a snapshot recording unit 114, a stable operation determining unit 115, an access record table 116, and an SS managing table 117.

The virtual machine managing unit 111 implements the virtual machine 12, and manages and controls the virtual machine 12. The communications monitoring unit 112 monitors communications performed by the virtual machine 12, and detects abnormalities of the virtual machine 12. For example, the communications monitoring unit 112 determines whether there is an abnormality, based on changes in the amount of communications performed by the virtual machine 12 (for example, changes in the number of packets in TCP/IP communications). Each virtual machine 12 includes a virtual NIC (Network Interface Card). The virtual machine 12 performs communications with the use of the virtual NIC, through the virtual machine monitor 11 via the interface device 105. Therefore, the communications monitoring unit 112 monitors the route of the communications in the virtual machine monitor 11, performed by the virtual machine 12. The communications monitoring unit 112 records the monitor results in the access record table 116.

The configuration change detecting unit 113 detects changes (or indications of changes) in the configuration of the virtual machine 12. Changes in the configuration of the virtual machine 12 mean changes in configuration management files of the various software items operating in the virtual machine 12. A configuration management file has parameters defining the operations of software recorded therein. A configuration management file is typically referred to as a setting file or a configuration. Therefore, when the configuration change detecting unit 113 determines that any of the configuration management files have changed or have likely changed, the configuration change detecting unit 113 determines that the configuration of the virtual machine 12 has changed.

The snapshot recording unit 114 records, in the secondary storage device 102, a snapshot of the entire file system 122 of the virtual machine 12. However, the snapshot may be recorded in an external storage device that is connected to the information processing apparatus 10 via a network. The stable operation determining unit 115 monitors the operation status of the virtual machine 12. The stable operation determining unit 115 determines that the virtual machine 12 is not stably operating when the operation status corresponds to (satisfies) a predetermined condition. The stable operation determining unit 115 determines that the virtual machine 12 is stably operating when the operation status does not correspond to the predetermined condition. Stable operation means that there are no abnormalities in the operations of the various software items in the virtual machine 12. For example, when the virtual machine 12 is operating as a server, and there are no errors or delays relevant to services provided by the server, it means that the virtual machine 12 is stably operating. When the stable operation determining unit 115 determines that the virtual machine 12 is not stably operating, the stable operation determining unit 115 deletes the latest (last) snapshot that has been recorded. This is because it is not considered that the latest snapshot guaranties stable operation of the virtual machine 12.

The SS managing table 117 is for managing attribute information of the saved snapshot. SS stands for snapshot.

Meanwhile, the virtual machine 12 includes a VM monitor agent 121. The VM monitor agent 121 monitors the configuration of the virtual machine 12, and detects changes (or indications of changes) in the configuration. For example, the VM monitor agent 121 monitors the configuration management file that is the monitor target, and detects changes in the file. Identification information (for example, a file name) of the configuration management file that is a monitor target of the VM monitor agent 121 is saved in advance in the file system 122 of the virtual machine 12. The VM monitor agent 121 may monitor changes in the file by a method of the conventional technology. For example, the VM monitor agent 121 may monitor the time/date that the file is updated, or changes in the file size. Other methods may be used to detect changes in the configuration management file.

Figure 4:
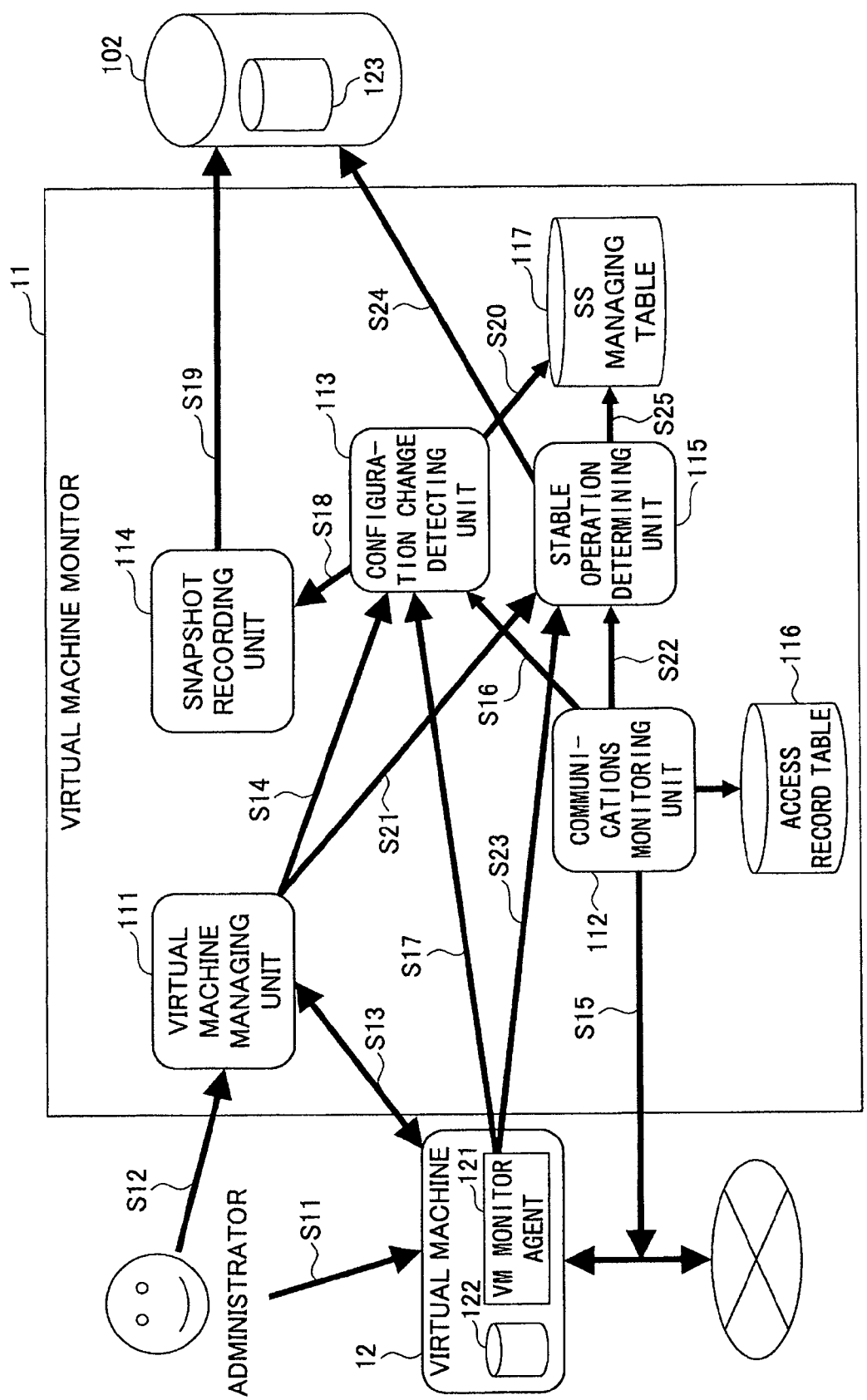
FIG. 4 illustrates processing procedures of the virtual machine monitor according to an embodiment of the present invention.

The processing procedures of the information processing apparatus 10 are described below. FIG. 4 illustrates the processing procedures of the virtual machine monitor 11 according to an embodiment of the present invention.

In step S11, for example, an administrator edits (updates) one of the configuration management files in the virtual machine 12. The configuration management file may be edited with the use of a tool such as a text editor, or with the use of an editing tool dedicated to the configuration management file. Subsequently, the administrator instructs the virtual machine managing unit 111 to reboot or shut down the virtual machine 12 (step S12). This is done so that the contents of the updated configuration management file are applied to operations of the software. For example, the instruction to reboot the virtual machine 12 is given through a GUI (Graphical User Interface) provided by the virtual machine managing unit 111. Specifically, the reboot instruction is input by selecting a predetermined menu item in a menu displayed on the display device 106 by the virtual machine managing unit 111. Furthermore, when plural virtual machines 12 are being activated, the virtual machine managing unit 111 causes the display device 106 to display a list of the virtual machines 12, so that the administrator may select the virtual machine 12 to be rebooted from the list.

In response to an instruction to reboot or to shut down the virtual machine 12, the virtual machine monitor 11 reboots or shuts down the virtual machine 12 selected as the target to be rebooted or shut down (step S13). Subsequently, the virtual machine managing unit 111 sends, to the configuration change detecting unit 113, a report that the virtual machine 12 has been rebooted or shut down, together with identification information of the corresponding virtual machine 12 (step S14). The target of reboot or shutdown may be an OS in the virtual machine 12. In this case, the report is sent to the configuration change detecting unit 113 when the OS is rebooted or shut down.

Meanwhile, the communications monitoring unit 112 constantly monitors communications performed by the virtual machine 12, regardless of whether the virtual machine 12 is rebooted or asynchronously to the rebooting of the virtual machine 12 (step S15). Specifically, the communications monitoring unit 112 monitors whether there is access to ports corresponding to port numbers that have been set in a list in advance as monitor targets. For example, the monitor targets are port numbers of ports that are open for receiving management requests, in the respective software items. In some software items, the port for receiving a request for a service (hereinafter, "service-use port"), and the port for managing or controlling the corresponding software item (hereinafter, "management-use port") may be clearly distinguished from one another. In step S15, the management-use port is the monitor object. This is because a request to change the contents of the configuration management file is likely to be set at the management-use port. When the communications monitoring unit 112 detects a packet that is destined to the management-use port, the communications monitoring unit 112 sends, to the configuration change detecting unit 113, a report that an access to the management-use port has been detected, together with identification information of the virtual machine 12 to which the packet is destined (step S16). For example, a port number included in "well known port number" may be set as the specified value of a port number of the service-use port or the management-use port.

Furthermore, when the VM monitor agent 121 of the virtual machine 12 detects a change in the configuration management file that is a monitor target, the VM monitor agent 121 sends, to the configuration change detecting unit 113, a report of the change together with identification information of the corresponding virtual machine 12 (step S17). In order to use the VM monitor agent 121, the VM monitor agent 121 needs to be mounted in the virtual machine 12. When the information processing apparatus 10 is a computer that provides services in a cloud environment, the virtual machine 12 may be included among a client's assets. In this case, it is necessary to obtain approval from the client to mount the VM monitor agent 121 in the virtual machine 12. Meanwhile, there is no need to obtain the client's approval to detect changes in the configuration when the virtual machine 12 is rebooted or shut down, or to detect changes in the configuration while monitoring the management-use ports. In this respect, the operations of detecting changes in the configuration when the virtual machine 12 is rebooted or shut down and detecting changes in the configuration while monitoring the management-use ports, are advantageous over using the VM monitor agent 121.

The configuration change detecting unit 113 determines that the configuration of the virtual machine 12 has changed, in response to receiving a report that the virtual machine 12 has been rebooted or shut down from the virtual machine managing unit 111 (step S14), in response to receiving a report that access to the management-use port has been detected from the communications monitoring unit 112 (step S16), or in response to receiving a report that the configuration management file has been updated from the VM monitor agent 121 (step S17). It is determined that the configuration of the virtual machine 12 has changed based on a report that the virtual machine 12 has been rebooted or shut down, because the virtual machine 12 is usually rebooted or shut down when the configuration management file has been changed. Accordingly, if the virtual machine 12 has been rebooted or shut down, it is highly likely that one of the configuration management files have been changed.

Next, the configuration change detecting unit 113 specifies the identification information of the virtual machine 12 that has been reported, and inputs a request to record a snapshot to the snapshot recording unit 114 (step S18). Next, the snapshot recording unit 114 acquires an image of the entire file system 122 of the virtual machine 12 corresponding to the specified identification information (hereinafter, "VM image"), and then records (saves) a snapshot 123 of the VM image in a predetermined storage area of the secondary storage device 102 (step S19). When recording the snapshot 123, past snapshots 123 of the same virtual machine 12 are not necessarily deleted. That is to say, the snapshots 123 of the same virtual machine 12 are accumulated, so that rollback may be performed.

Subsequently, the snapshot recording unit 114 records, in the SS managing table 117, attribute information relevant to the snapshot 123 that has been currently recorded (step S20).

Figure 5:
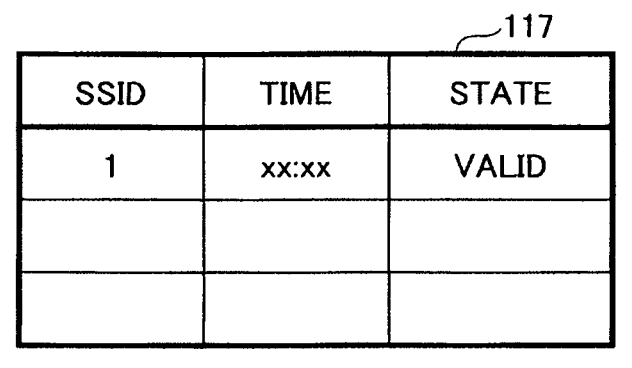

FIG. 5 illustrates an example of the SS managing table 117. As illustrated in FIG. 5, in the SS managing table 117, an SSID, a time, and a state are recorded for each snapshot 123. The entity of the SS managing table 117 is formed in the secondary storage device 102.

The SSID is an identifier for identifying the snapshot 123. That is to say, in the present embodiment, it is possible to identify the snapshot 123 by the SSID. The time indicates when the snapshot 123 has been recorded. The state indicates the state of the snapshot 123. The state may be a value representing "valid" or "invalid". "Valid" indicates that the corresponding snapshot 123 is saved in the secondary storage device 102. "Invalid" indicates that the corresponding snapshot 123 is not saved in the secondary storage device 102. The initial value of the state is "valid". In FIG. 5, only one record (entry) is recorded; however, when plural snapshots 123 are recorded for the same virtual machine 12, plural records corresponding to the plural snapshots 123 are recorded in the SS managing table 117.

In the present embodiment, it is assumed that one SS managing table 117 is created for each virtual machine 12, as a matter of convenience. In a case where one SS managing table 117 is used to manage information relevant to the snapshots 123 of all of the virtual machines 12, an item (column) for recording identification information items of the virtual machines 12 is to be added to the SS managing table 117.

In another example, the SSID of a snapshot 123 from which each snapshot 123 has been derived may be recorded in the SS managing table 117, so that the derivative relationships between snapshots may be identified. For example, when the virtual machine 12 has been activated based on a snapshot 123 having an SSID of "A", "A" is recorded as the SSID of the derivation source of the snapshot 123 to be recorded while the virtual machine 12 is activated. By recording the derivation source of each snapshot 123, a tree structure of snapshots 123 may be formed. Accordingly, the administrator may easily grasp the relationships between the snapshots 123.

Meanwhile, the stable operation determining unit 115 monitors the operation status of the virtual machine 12 based on predetermined reports from the virtual machine managing unit 111, the communications monitoring unit 112, and the VM monitor agent 121 (steps S21, S22, and S23). When the stable operation determining unit 115 detects that the virtual machine 12 is not stably operating, the stable operation determining unit 115 acquires the SSID of the record that has been recorded last from the SS managing table 117, and deletes the snapshot 123 corresponding to the acquired SSID from the secondary storage device 102 (step S24). Subsequently, the stable operation determining unit 115 sets a value "invalid" as the state in the record corresponding to the deleted snapshot 123, in the SS managing table 117, (step S25).

As a result of the above process, the snapshots 123 that highly likely indicate stable operation are accumulated in the secondary storage device 102. That is to say, the snapshots 123 that do not indicate stable operation are not accumulated in the secondary storage device 102.

Figure 6:
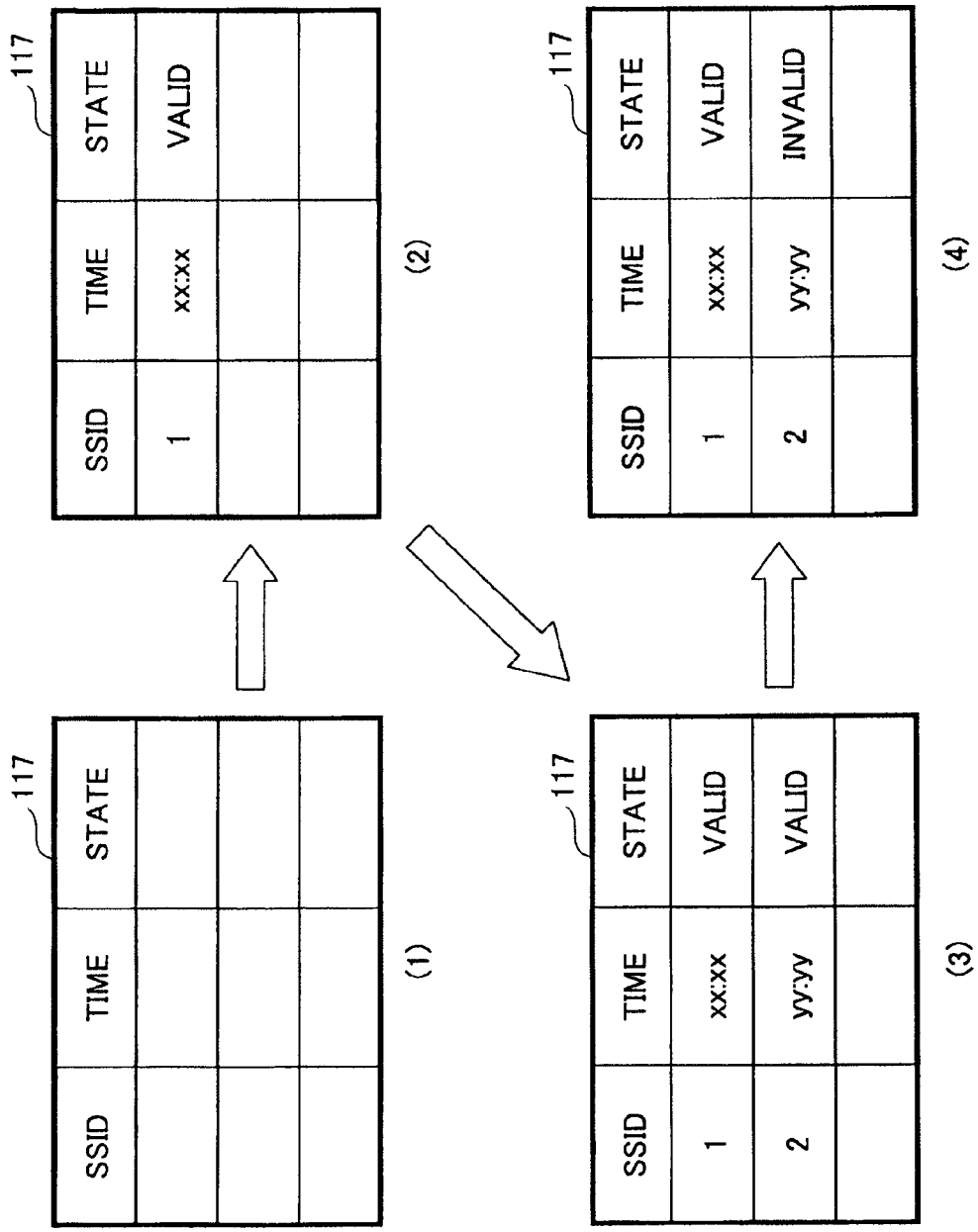
FIG. 6 illustrates transitions of contents recorded in the SS managing table.

FIG. 6 illustrates transitions of contents recorded in the SS managing table 117. In FIG. 6, (1) indicates the initial state of the SS managing table 117. Specifically, no snapshots 123 are recorded yet. In FIG. 6, (2) indicates a state where one snapshot 123 is recorded. A record (having an SSID of 1) corresponding to the one snapshot 123 is recorded. In this case, the SSID of the last recorded snapshot 123 is "1". In FIG. 6, (3) indicates a state where a new snapshot 123 is recorded. The SSID of the newly recorded snapshot 123 is "2". In this case, the SSID of the last recorded snapshot 123 is "2". In the state of (3), when the stable operation determining unit 115 detects that the virtual machine 12 is not stably operating, the state of the SS managing table 117 changes to the state indicated by (4). Specifically, the last recorded snapshot 123 is deleted, and the state of the deleted snapshot 123 is "invalid". In the state indicated by (4), it may determined that the last recorded snapshot 123 is not included in the SS managing table 117, or it may be determined that the snapshot 123 having an SSID of "1" is the last recorded snapshot 123.

Figure 7:
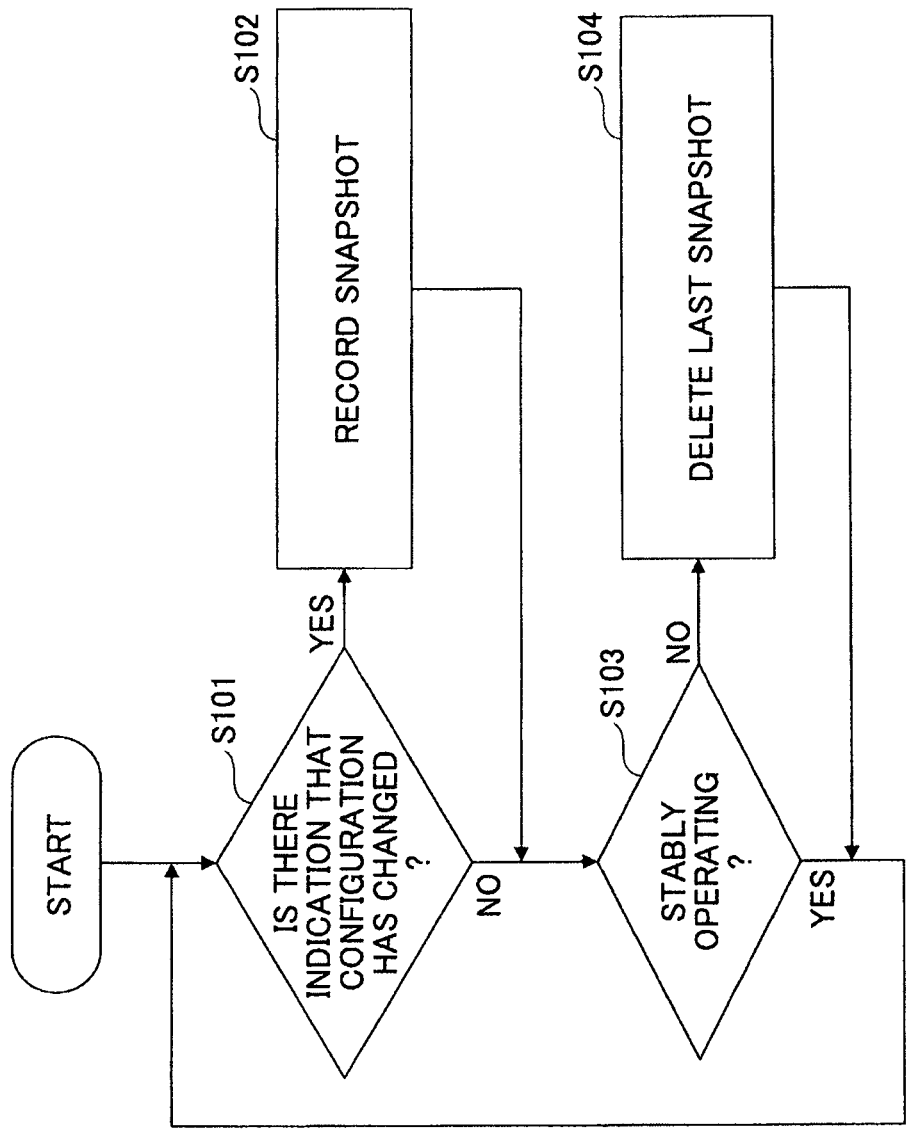
FIG. 7 is a flowchart for describing the overall flow of a process executed by the information processing apparatus.

Next, the process described with reference to FIG. 4 is described with reference to a flowchart. FIG. 7 is a flowchart for describing the overall flow of the process executed by the information processing apparatus 10.

The configuration change detecting unit 113 constantly (for example, periodically) confirms whether the configurations of the virtual machines 12 have changed (step S101). When the configuration change detecting unit 113 detects that the configuration of any of the virtual machines 12 has changed (YES in step S101), the snapshot recording unit 114 records, in the secondary storage device 102, the snapshot 123 of the VM image of the virtual machine 12 that has been detected as having a changed configuration (step S102). The snapshot recording unit 114 records the attribute information of the recorded snapshot 123 in the SS managing table 117. The upper limit of the number of snapshots 123 that the secondary storage device 102 is capable of saving may be set in advance. When the upper limit is set, and the number of saved snapshots 123 has reached the upper limit, the snapshot recording unit 114 deletes any one the snapshots 123 before recording a new snapshot 123. Accordingly, it is possible to reduce the amount of the storage capacity consumed by the snapshots 123. The snapshot 123 to be deleted may be the oldest snapshot 123, or a snapshot 123 that is relatively similar to the snapshot 123 that is about to be recorded.

Meanwhile, the stable operation determining unit 115 constantly (for example, periodically) monitors the operation status of the virtual machines 12 (step S103). When the stable operation determining unit 115 detects a virtual machine 12 that is not stably operating (NO in step S103), the stable operation determining unit 115 deletes the last snapshot 123 of the corresponding virtual machine 12 from the secondary storage device 102 (step S104). The stable operation determining unit 115 sets, in the SS managing table 117, "invalid" as the state of the deleted snapshot 123. The record of the deleted snapshot 123 itself may be deleted from the SS managing table 117. In this case, an item for "state" does not necessarily need to be provided in the SS managing table 117.

In FIG. 7, the pair of steps S101 and S102 and the pair of steps S103 and S104 are indicated in a serial manner. However, the pair of steps S101 and S102 and the pair of steps S103 and S104 may be executed in parallel or asynchronously. Alternatively, steps S103 and S104 may be executed when step S102 is executed.

Figure 8:
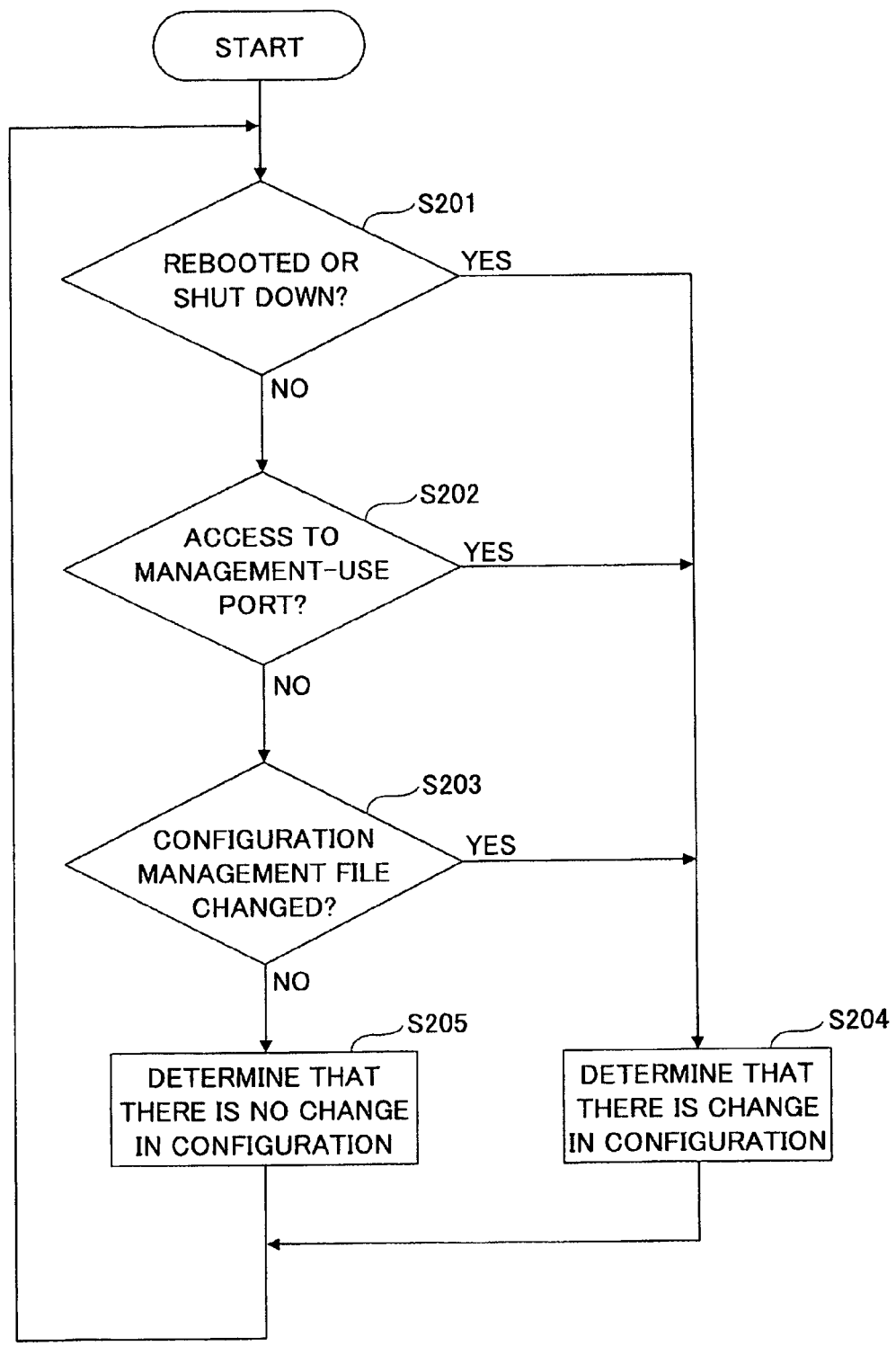
FIG. 8 is a flowchart for describing a process of determining whether the configurations of the virtual machines have changed.

Next, details of step S101 in FIG. 7 are described. FIG. 8 is a flowchart for describing the process of determining whether the configurations of the virtual machines 12 have changed.

The configuration change detecting unit 113 determines that there has been a change in the configuration of the virtual machine 12 corresponding to the identification information specified in a received report, in response to receiving a report that the virtual machine 12 has been rebooted or shut down from the virtual machine managing unit 111 (YES in step S201), or in response to receiving a report that access to the management-use port has been detected from the communications monitoring unit 112 (YES in step S202), or in response to receiving a report that the configuration management file has been updated from the VM monitor agent 121 (YES in step S203). Meanwhile, when none of the above reports are received (NO in step S203), the configuration change detecting unit 113 determines that none of the configurations of the virtual machines 12 have been changed (step S205).

It may be determined that a configuration of a virtual machine 12 has changed when a predetermined software item operating on the OS of the virtual machine 12 has been ended or rebooted. This is because in this case, it is likely that the configuration management file has been changed. The VM monitor agent 121 may monitor whether a predetermined software item has been ended or rebooted.

Figure 9:
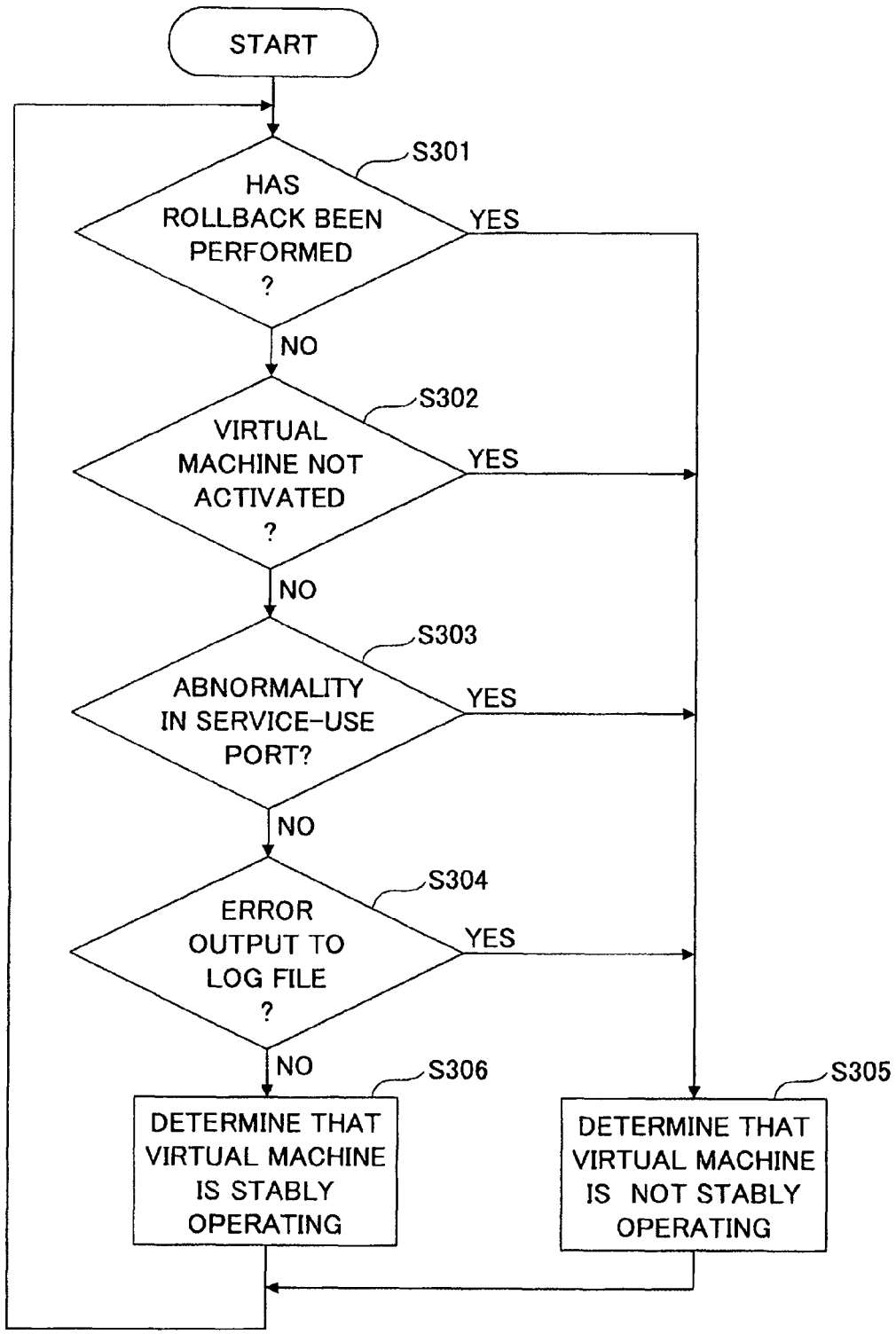
FIG. 9 is a flowchart for describing a process of determining whether stable operations are performed.

Next, details of step S103 in FIG. 7 are described. FIG. 9 is a flowchart for describing the process of determining whether stable operation is performed.

When the virtual machine 12 has performed rollback (YES in step S301), the stable operation determining unit 115 determines that the corresponding virtual machine 12 is not stably operating (step S305). Rollback is a process of returning the file system 122 of the virtual machine 12 to a state indicated by a saved snapshot 123. Usually, rollback is performed when a failure has occurred as a result of changing the configuration management file. This is done for the purpose of returning to a normal state (stable operation status) that is the state before changing the configuration management file. Thus, when rollback is executed, it means that it is highly likely that the virtual machine 12 has not been stably operating. Therefore, the stable operation determining unit 115 determines that the virtual machine 12 that has performed rollback has not been stably operating.

Rollback of the virtual machine 12 is ordered by the administrator, via a GUI provided by the virtual machine managing unit 111. In the GUI (screen page), the administrator selects a saved snapshot 123 and a virtual machine 12 that is a target of rollback, and orders execution of the rollback. The virtual machine managing unit 111 executes rollback on the selected virtual machine 12 based on the selected snapshot 123. The virtual machine managing unit 111 sends a report, to the stable operation determining unit 115, that the rollback has been executed together with the identification information of the virtual machine 12 that is the rollback target. In step S301, the stable operation determining unit 115 detects that rollback has been executed based on the report.

When there is a virtual machine 12 that is not activated (YES in step S302), the stable operation determining unit 115 determines that the corresponding virtual machine 12 is not stably operating (step S305). This is because when the virtual machine 12 is not activated, it is highly likely that some failure has occurred. The virtual machine 12 is activated according to an instruction given by the administrator via a GUI provided by the virtual machine managing unit 111. In the GUI (screen page), the administrator selects the virtual machine 12 to be activated. The virtual machine managing unit 111 activates the selected virtual machine 12. When the virtual machine 12 is not activated, the virtual machine managing unit 111 sends a report that the virtual machine 12 is not activated together with the identification information of the corresponding virtual machine 12, to the stable operation determining unit 115. In step S302, the stable operation determining unit 115 detects that there is a virtual machine 12 that is not activated, based on the report.

When the stable operation determining unit 115 detects that there is a possible abnormality in communications performed via the service-use port by a virtual machine 12 (YES in step S303), the stable operation determining unit 115 determines that the corresponding virtual machine 12 is not stably operating (step S305). A service-use port is used by a certain software item for receiving requests for services, under regular operations. When there is a possible abnormality in communications performed via the service-use port, it is highly likely that the virtual machine 12 is not stably operating. Therefore, the stable operation determining unit 115 determines that the virtual machine 12, which is detected as having a possible abnormality in communications performed via the service-use port, is not stably operating. For example, when there is an abnormality in communications, the number of packets is reduced compared to the state before the snapshot 123 is recorded, by greater than or equal to a predetermined number or by greater than or equal to a predetermined ratio. A report of the possible abnormality in communications performed via the service-use port is received from the communications monitoring unit 112, as described below. Based on the received report, in step S303, the stable operation determining unit 115 detects that there is a virtual machine 12 having a possible abnormality in communications performed via the service-use port.

When there is a virtual machine 12 in which a software item outputting error information to the log file is operating (YES in step S304), the stable operation determining unit 115 determines that the corresponding virtual machine 12 is not stably operating (step S305). This is because when a virtual machine 12 has a software item that is generating errors, it is highly likely that the virtual machine 12 is not properly providing services.

The VM monitor agent 121 may monitor whether error information is being output to the log file. Specifically, the VM monitor agent 121 monitors contents of the log file that is the monitor target, and sends a report to the stable operation determining unit 115 if a character string indicating an error is detected. The report indicates that error information is output to the log file and identification information of the corresponding virtual machine 12. In step S304, the stable operation determining unit 115 detects that there is a virtual machine 12 in which a software item outputting error information to the log file is operating, based on the report. However, the stable operation determining unit 115 may directly monitor the log file. In this case, identification information (for example, a file name) of a log file that is a monitor target is to be set in the stable operation determining unit 115.

When none of steps S301 through S304 apply (NO in step S304), the stable operation determining unit 115 determines that the virtual machines 12 are stably operating (step S306).

That is to say, in the present embodiment, steps S301 through S304 correspond to predetermined conditions by which the stable operation determining unit 115 determines whether the virtual machines 12 are stably operating.

Figure 10:
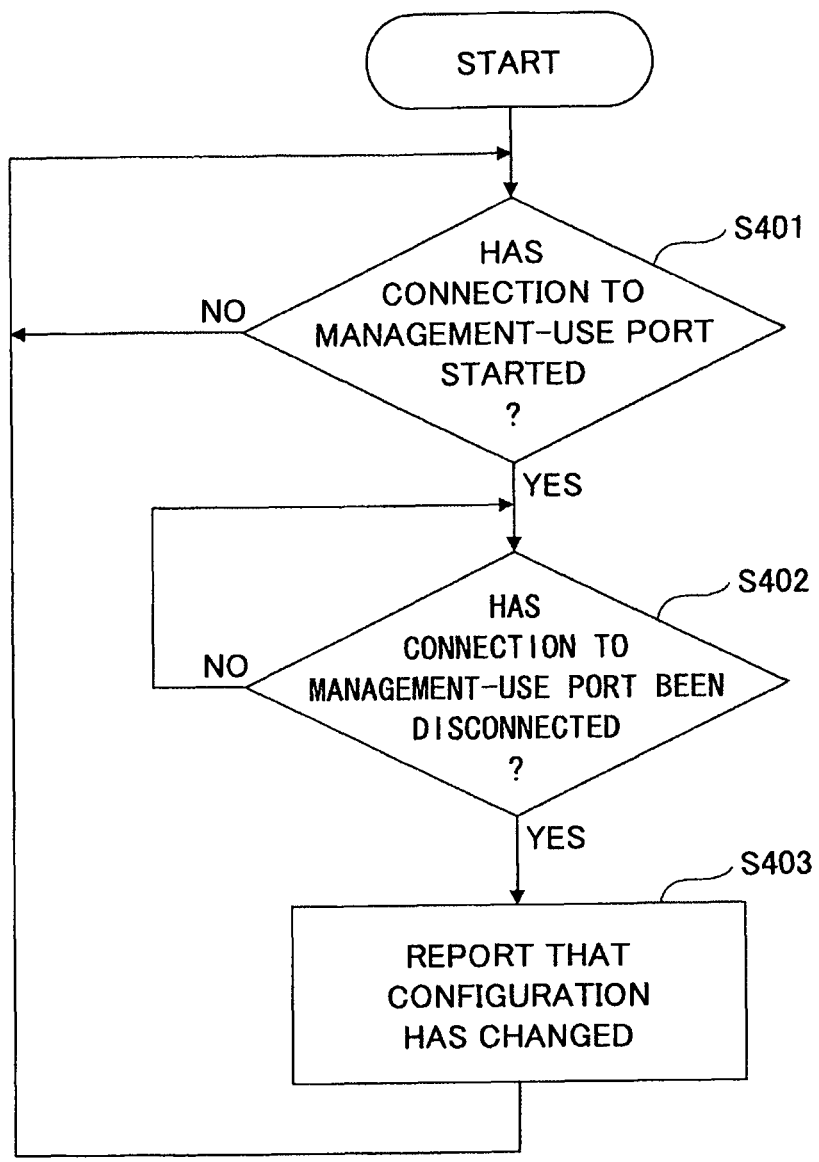
FIG. 10 is a flowchart for describing a process of reporting that access to a management-use port has been detected.

Next, details of step S202 of FIG. 8 are described. FIG. 10 is a flowchart for describing the process of reporting that access to the management-use port has been detected. The process of FIG. 10 is started as the virtual machine 12 is activated, and is executed for each virtual machine 12.

When the communications monitoring unit 112 detects that connection to the management-use port has started (i.e., a request to connect to the management-use port is made) (step S401), the communications monitoring unit 112 waits until the connection is disconnected (step S402). When the communications monitoring unit 112 detects that the connection is disconnected (YES in step S402), the communications monitoring unit 112 specifies identification information of the virtual machine 12 that is the process target, and sends a report to the configuration change detecting unit 113 that the configuration of the corresponding virtual machine 12 has changed (step S403).

Figure 11:
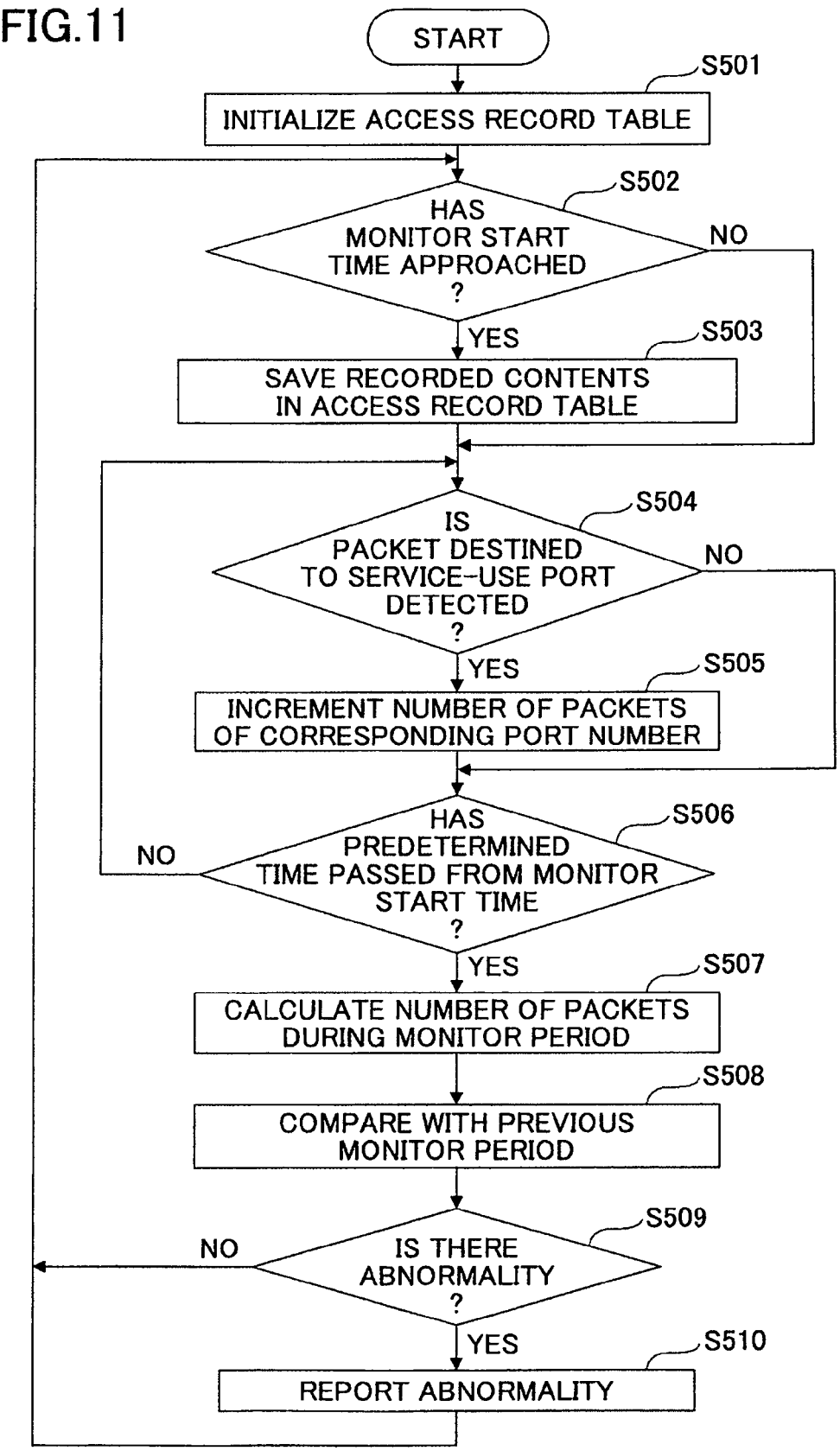
FIG. 11 is a flowchart for describing a process of reporting that there is an abnormality in communications performed via a service-use port.

Next, details of step S303 in FIG. 9 are described. FIG. 11 is a flowchart for describing the process of reporting that there is an abnormality in communications performed via the service-use port. The process of FIG. 11 is started as the virtual machine 12 is activated, and is executed for each virtual machine 12. Furthermore, the process of FIG. 11 ends as the virtual machine 12 that is the process target is shut down (ended).

In step S501, the communications monitoring unit 112 initializes the access record table 116 (step S501). Specifically, the communications monitoring unit 112 discards the recorded contents of the access record table 116 corresponding to the virtual machine 12 that is the process target. Next, the communications monitoring unit 112 determines whether the monitor start time has approached (step S502). The monitor start time is the starting time of the monitor period. The monitor period is a period that is set in advance, for example, a predetermined time period within a day. When the monitor start time has approached (YES in step S502), the communications monitoring unit 112 saves the recorded contents in the access record table 116 at the present time point (step S503). That is to say, a copy of the recorded contents in the access record table 116 at the present time point is generated in the secondary storage device 102. When the monitor start time has not approached (NO in step S502), the recorded contents in the access record table 116 are not saved.

When a packet destined for the service-use port is detected (YES in step S504), the communications monitoring unit 112 updates the access record table 116 (step S505).

FIG. 12 illustrates an example of the access record table 116. As illustrated in FIG. 12, in the access record table 116, the number of received packets is recorded for each service-use port. Therefore, in step S505, the communications monitoring unit 112 increments the number of packets by one, for the port number that is the destination of the detected packet.

Next, the communications monitoring unit 112 determines whether a predetermined time (for example, one hour) has passed from the monitor start time (step S506). That is to say, the communications monitoring unit 112 determines whether the monitor period has ended. When the monitor period has not ended (NO in step S506), the communications monitoring unit 112 repeats the steps from step S504 onward. Accordingly, the access record table 116 is updated every time a packet destined to the service-use port is detected.

When the monitor period has ended (YES in step S506), the communications monitoring unit 112 calculates the number of packets received during the current monitor period at each service-use port (step S507). Specifically, the number of received packets during the current monitor period is calculated by subtracting the number of packets saved in step S503 from the number of packets recorded in the access record table 116 when the monitor period ends. The calculated number of packets is recorded in the memory device 103 in association with the current monitor period.

Next, the communications monitoring unit 112 determines whether there is an abnormality by comparing the numbers of packets received during the current monitor period at the service-use ports with the numbers of packets received during the previous monitor period at the service-use ports (step S508). For example, when the communications monitoring unit 112 detects that there is a service-use port in which the current number of packets has decreased by a predetermined number or by a predetermined ratio with respect to the previous number of packets, the communications monitoring unit 112 determines that there is an abnormality. When the number of packets has significantly decreased, it means that the service of the corresponding service-use port may not be properly provided. Specifically, when the communications monitoring unit 112 detects that there is a service-use port satisfying the following condition of packet numbers, the communications monitoring unit 112 determines that there is an abnormality.

(previous number of packets)×0.01>current number of packets

The above condition indicates that it is determined that there is an abnormality if the current number of packets is less than or equal to one one-hundredth of the previous number of packets. The numbers of packets received at the respective service-use ports during the previous monitor period have been recorded in the memory device 103 when the previous monitor period ended.

When the communications monitoring unit 112 determines that there is an abnormality (YES at step S509), the communications monitoring unit 112 sends a report to the stable operation determining unit 115, that a possible abnormality in communications performed via the service-use port has been detected (step S510). Such a report includes identification information of the virtual machine 12 that is the process target. When the communications monitoring unit 112 determines that there is no abnormality (NO at step S509), the communications monitoring unit 112 repeats the process from step S502 onward.

The process of FIG. 11 is continued until the virtual machine 12 that is the process target is ended. Therefore, when the virtual machine 12 is ended, the accumulated numbers of packets received while the virtual machine 12 was operating are recorded in the access record table 116 for the respective service-use ports.

The monitor period is preferably at the same time period every day. The usage statuses of services significantly change according to the time period. Thus, if different time periods are compared, it may be erroneously determined that there is an abnormality even when there is no abnormality. By setting the monitor period at the same time period every day, the number of packets in the time period on the previous day may be compared with the number of packets in the time period of today.

However, in order to more rigorously measure the changes in the number of packets before and after the snapshot 123, the monitor period may be sectioned at the time point of recording a snapshot 123. For example, when a snapshot 123 is for recording the number of packets counted for one hour, the number of packets counted during a period immediately before the snapshot 123 is recorded may be compared with the number of packets counted during a period immediately after the snapshot 123 is recorded.

A known technology such as Wireshark may be used as the technology of monitoring packets as described with reference to FIGS. 10 and 11.

Abnormalities in the virtual machine 12 may be detected with the use of SNMP (Simple Network Management Protocol), instead of the process of FIG. 11, or together with the process of FIG. 11. For example, when the VM monitor agent 121 acting as an SNMP agent detects a failure in the virtual machine 12, the VM monitor agent 121 may report the failure to the stable operation determining unit 115. However, when the VM monitor agent 121 acting as an SNMP agent detects a failure in the hardware of the information processing apparatus 10 (i.e., a physical failure), the VM monitor agent 121 does not need to report the failure to the stable operation determining unit 115. This is because failures in the hardware do not depend on the configuration of a particular virtual machine 12.

As described above, in the information processing apparatus 10 according to the present embodiment, the snapshots 123 are automatically recorded based on indications of changes in the configuration of the virtual machine 12. Therefore, it is possible to reduce the load of operations on the user, and to prevent a situation where the user forgets to record the snapshots 123. Furthermore, when it is detected that the virtual machine 12 is not stably operating, the last snapshot 123 recorded for the corresponding virtual machine 12 is deleted. When it is detected that the virtual machine 12 is not stably operating, the last snapshot 123 recorded for the corresponding virtual machine 12 may not guarantee stable operation.

Thus, such a snapshot 123 has low utility value. Accordingly, by deleting such a snapshot 123, unnecessary snapshots 123 are appropriately prevented from being needlessly saved.

Such a snapshot 123 does not need to be forcibly or automatically deleted. For example, when the stable operation determining unit 115 detects that the virtual machine 12 is not stably operating, the stable operation determining unit 115 may cause the display device 106 to display a screen page with which a user may select whether to delete the snapshot 123. The stable operation determining unit 115 may delete the snapshot 123 when an instruction to delete the snapshot 123 is input via the screen page. It is particularly effective to query the user via the screen page when the communications monitoring unit 112 has detected an abnormality. The number of packets received by the service-use port may decrease merely because the number of requests for services of the software operating in the virtual machine 12 has decreased.

The virtual machine managing unit 111 may cause the display device 106 to display information recorded in the SS managing table 117 and the access record table 116, in response to operation instructions from an administrator. Examples of such information are time points when the snapshots 123 have been recorded and accesses to the respective service-use ports while the virtual machine 12 is operated. The time points when the snapshots 123 are recorded are acquired from the SS managing table 117. Information relevant to accesses (number of packets) to the respective service-use ports while the virtual machine 12 is operated (from when the virtual machine 12 is activated to when the virtual machine 12 is ended) is acquired from the access record table 116.

Furthermore, for example, in a case where the load is distributed by a load balancer, it is possible to clearly recognize the period during which the virtual machine 12 is not used from outside. In this case, the timing of recording the snapshot 123 may be shifted to a timing during such a period. That is to say, when the configuration change detecting unit 113 detects a change in the configuration, the configuration change detecting unit 113 does not immediately record the snapshot 123, but records the snapshot 123 when such a period starts. Accordingly, even if there is a delay in a process relevant to a service caused by the load of a recording process of the snapshot 123, it is possible to hide such a delay from the client (user of the service).

Known technologies other than those described in the present embodiment may be applied for monitoring changes in the configuration of the virtual machine 12 and monitoring the operation status. For example, a known operations management tool may be used. Operations management tools include a mechanism for monitoring changes in the configuration of the virtual machine 12 and monitoring the operation status. Therefore, the configuration change detecting unit 113 or the stable operation determining unit 115 may detect changes in the configuration of the virtual machine 12 or determine whether the virtual machine 12 is stably operating, with the use of such an operations management tool.

Figure 13:
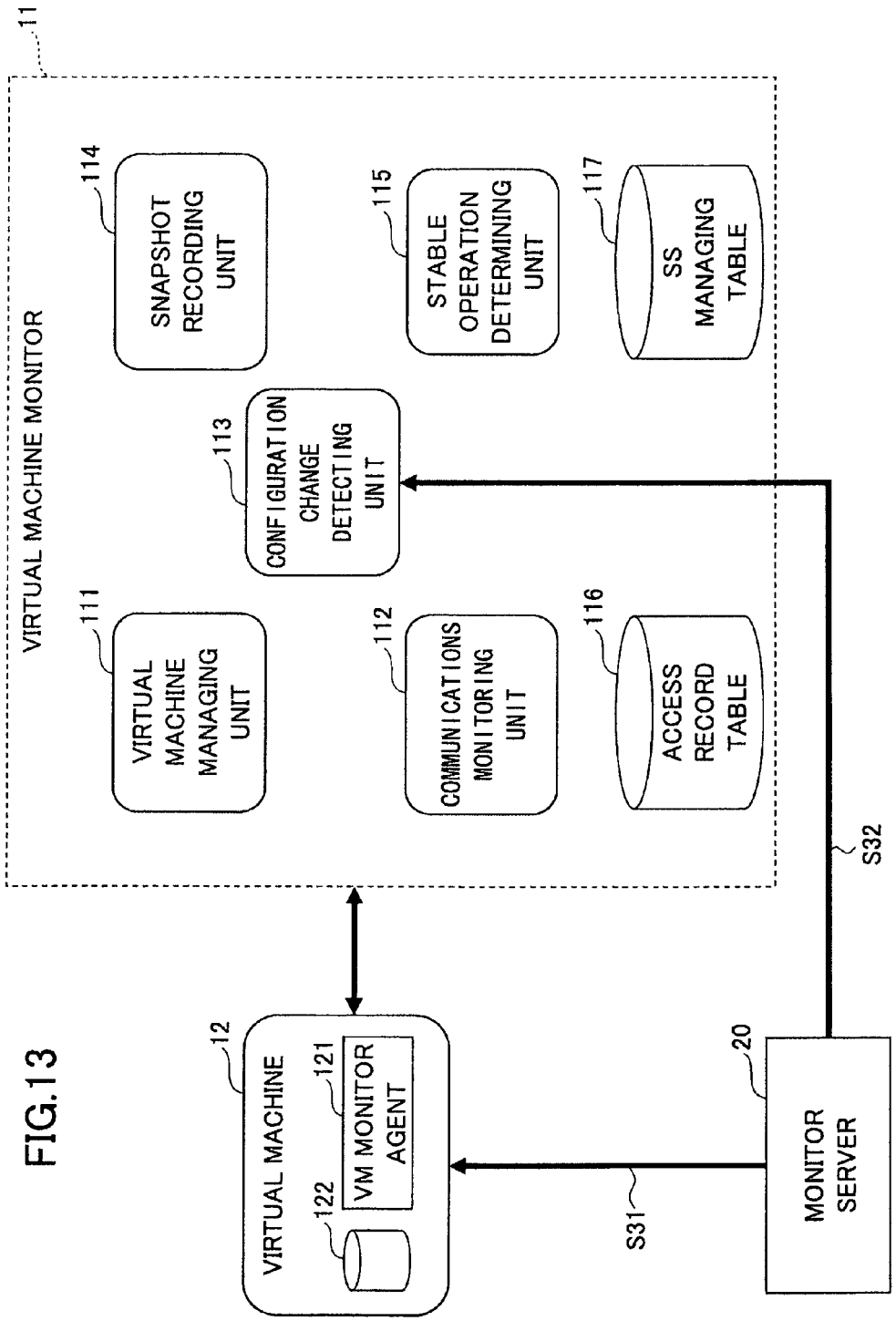
FIG. 13 illustrates an example where an external device is monitoring the operation status of the virtual machine.

Furthermore, the operation status of the virtual machine 12 may be monitored by an external device. FIG. 13 illustrates an example where an external device is monitoring the operation status of the virtual machine 12.

In FIG. 13, a monitor server 20 is a computer that is connected to the information processing apparatus 10 via a network. The monitor server 20 has a so-called health check function. When an abnormality of the virtual machine 12 is detected by the health check function (step S31), the monitor server 20 reports to the stable operation determining unit 115 that an abnormality has been detected (step S32). In response to the report, the stable operation determining unit 115 deletes the last snapshot 123 of the virtual machine 12.

More specifically, for example, the monitor server 20 implements the health check function by periodically accessing a website (web page) provided by an HTTP server that is a software item operating in the virtual machine 12. When an abnormality has occurred while accessing the website (for example, an error response is received or a response is not returned), the monitor server 20 determines that an abnormality has occurred in the virtual machine 12.

The present invention is not limited to the specific embodiments described herein, and variations and modifications may be made without departing from the scope of the present invention.

According to one embodiment of the present invention, it is possible to appropriately limit the number of saved snapshots of a file system of a virtual machine.

All examples and conditional language recited herein are intended for pedagogical purposes to aid the reader in understanding the invention and the concepts contributed by the inventors to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A snapshot management method executed by a computer, the snapshot management method comprising:
    detecting a change in a configuration of a virtual machine;
    recording, in a storage unit, a snapshot of a file system of the virtual machine when the change in the configuration is detected; and
    determining a stable operation of the virtual machine by monitoring an operation status of the virtual machine after the virtual machine has been rebooted, and deleting, from the storage unit, the last recorded snapshot for the virtual machine when the operation status satisfies a predetermined condition to prevent the last recorded snapshot from being saved.

2. The snapshot management method according to claim 1, wherein
    the detecting includes detecting the change in the configuration of the virtual machine based on communications performed by the virtual machine via a predetermined port.

3. The snapshot management method according to claim 1, further comprising:
    monitoring communications performed by the virtual machine via a predetermined port and detecting an abnormality in the communications based on a change in a communications amount, wherein
    the determining includes deleting, from the storage unit, the last recorded snapshot for the virtual machine when the abnormality in the communications is detected.

4. The snapshot management method according to claim 1, wherein
    the determining includes causing a display device to display a screen page used for selecting whether to delete the snapshot, and deleting the snapshot according to an input made via the screen page.

5. A snapshot management apparatus comprising:
    a configuration change detection unit that detects a change in a configuration of a virtual machine;

a snapshot recording unit that records, in a storage unit, a snapshot of a file system of the virtual machine when the change in the configuration is detected; and a stable operation determining unit that determines a stable operation of the virtual machine by monitoring an operation status of the virtual machine after the virtual machine has been rebooted, and deleting, from the storage unit, the last recorded snapshot for the virtual machine when the operation status satisfies a predetermined condition to prevent the last recorded snapshot from being saved.

6. The snapshot management apparatus according to claim 5, wherein the configuration change detection unit detects the change in the configuration of the virtual machine based on communications performed by the virtual machine via a predetermined port.

7. The snapshot management apparatus according to claim 5, further comprising:

a communications monitoring unit that monitors communications performed by the virtual machine via a predetermined port and detects an abnormality in the communications based on a change in a communications amount, wherein the stable operation determining unit deletes, from the storage unit, the last recorded snapshot for the virtual machine when the abnormality in the communications is detected.

8. The snapshot management apparatus according to claim 5, wherein the stable operation determining unit causes a display device to display a screen page used for selecting whether to delete the snapshot, and deletes the snapshot according to an input made via the screen page.

9. A snapshot management apparatus comprising:

a processor to detect a change in a configuration of a virtual machine, to record, in a storage unit, a snapshot of a file system of the virtual machine when the change in the configuration is detected, and to determine a stable operation of the virtual machine by monitoring an operation status of the virtual machine after the virtual machine has been rebooted, and deleting, from the storage unit, the last recorded snapshot for the virtual machine when the operation status satisfies a predetermined condition to prevent the last recorded snapshot from being saved.

10. A computer-readable, non-transitory medium storing a program that causes a computer to execute a method comprising:

detecting a change in a configuration of a virtual machine;

recording, in a storage unit, a snapshot of a file system of the virtual machine when the change in the configuration is detected; and determining a stable operation of the virtual machine by monitoring an operation status of the virtual machine after the virtual machine has been rebooted, and deleting, from the storage unit, the last recorded snapshot for the virtual machine when the operation status satisfies a predetermined condition to prevent the last recorded snapshot from being saved.

11. The computer-readable, non-transitory medium according to claim 10, wherein the detecting includes detecting the change in the configuration of the virtual machine based on communications performed by the virtual machine via a predetermined port.

12. The computer-readable, non-transitory medium according to claim 10, wherein the method further comprises:

monitoring communications performed by the virtual machine via a predetermined port and detecting an abnormality in the communications based on a change in a communications amount, wherein the determining includes deleting, from the storage unit, the last recorded snapshot for the virtual machine when the abnormality in the communications is detected.

13. The computer-readable, non-transitory medium according to claim 10, wherein the determining includes causing a display device to display a screen page used for selecting whether to delete the snapshot, and deleting the snapshot according to an input made via the screen page.

* * * * *